(12) United States Patent
Kitade et al.

(10) Patent No.: US 6,590,609 B1
(45) Date of Patent: Jul. 8, 2003

(54) IMAGE SIGNAL RECORDING SYSTEM

(75) Inventors: Takeshi Kitade, Fujisawa (JP); Hiroshi Chiba, Yokohama (JP); Toshiro Kinugasa, Hiratsuka (JP); Tomishige Yatsugi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/026,207

(22) Filed: Feb. 19, 1998

(30) Foreign Application Priority Data

Feb. 21, 1997 (JP) .............................................. 9-037381

(51) Int. Cl.$^7$ ................................................ H04N 5/76
(52) U.S. Cl. ................................ 348/231.6; 348/231.7; 348/222.1
(58) Field of Search ................................. 348/231, 232, 348/233, 222, 207, 373, 374, 375, 552, 231.99, 231.1, 231.2, 231.3, 231.6, 231.7, 231.9, 222.1, 207.99; H04N 5/225

(56) References Cited

U.S. PATENT DOCUMENTS 5,153,729 A * 10/1992 Saito .......................... 348/231
5,477,264 A * 12/1995 Sarbadhikari et al. ...... 348/231
5,563,655 A * 10/1996 Lathrop ..................... 348/231

FOREIGN PATENT DOCUMENTS

JP 06253251 A 9/1994

OTHER PUBLICATIONS

A Video Pre/Post–Processing LSI for Video Capture, IEEE Transactions on Consumer Electronics, Kinugasa et al., vol. 42, No. 3, Aug. 1996.

* cited by examiner

Primary Examiner—Tuan Ho
(74) Attorney, Agent, or Firm—Mattingly, Stanger & Malur, P.C.

(57) ABSTRACT

To provide an image signal recording system for compressing image signals and storing compressed image data onto a storage-medium PC card; which prevents at least occurrence of an abnormal interruption of recording operation in the system. Conventionally, if a write data transfer rate of the PC card is relatively slow, full-motion picture data recording is disabled to cause an abnormal interruption of recording operation in the image signal recording system. Although there are conventional arrangements specifically designed for use with a dedicated card having a high rate of write data transfer, any arrangement applicable to write data transfer rates of various kinds of general-purpose PC cards has not been devised yet. The present invention provides an image signal recording system which is capable of detecting a write data transfer rate of each kind of PC card for inhibiting full-motion picture data recording or selecting a write data transfer rate meeting the detected transfer rate, thereby accomplishing above object.

18 Claims, 4 Drawing Sheets

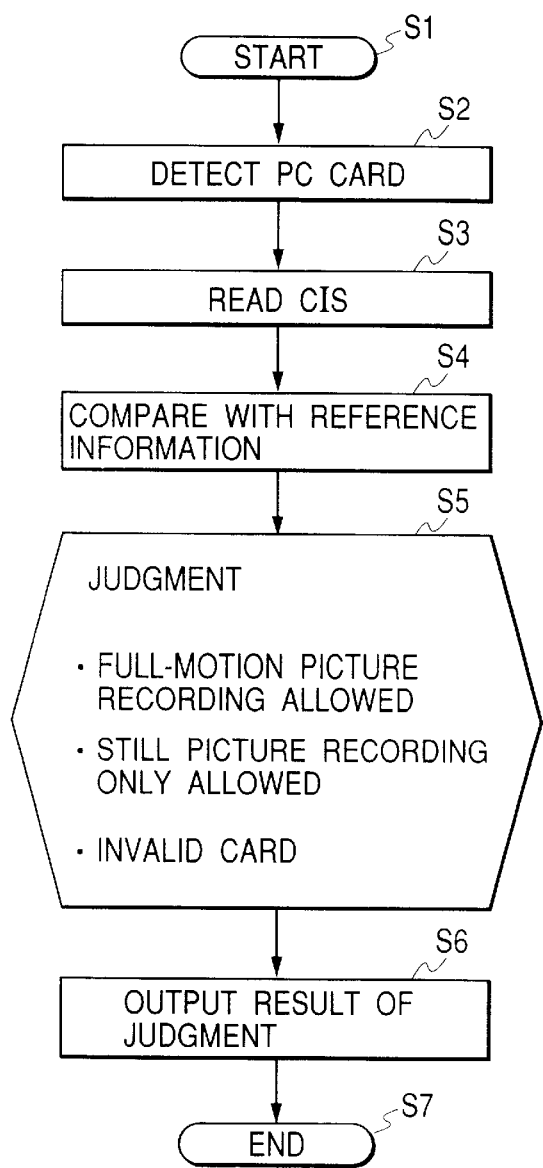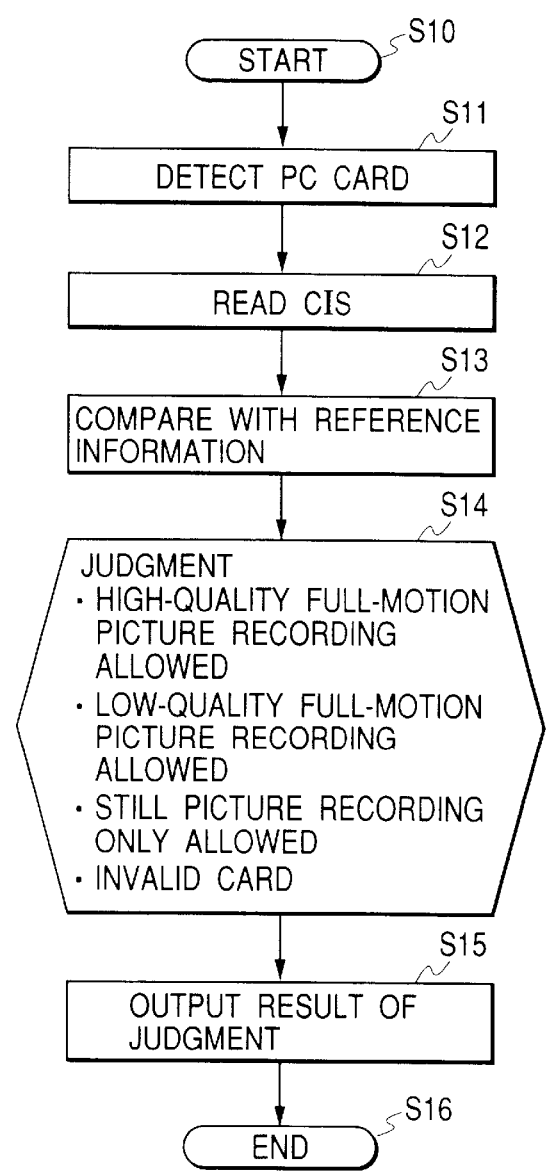

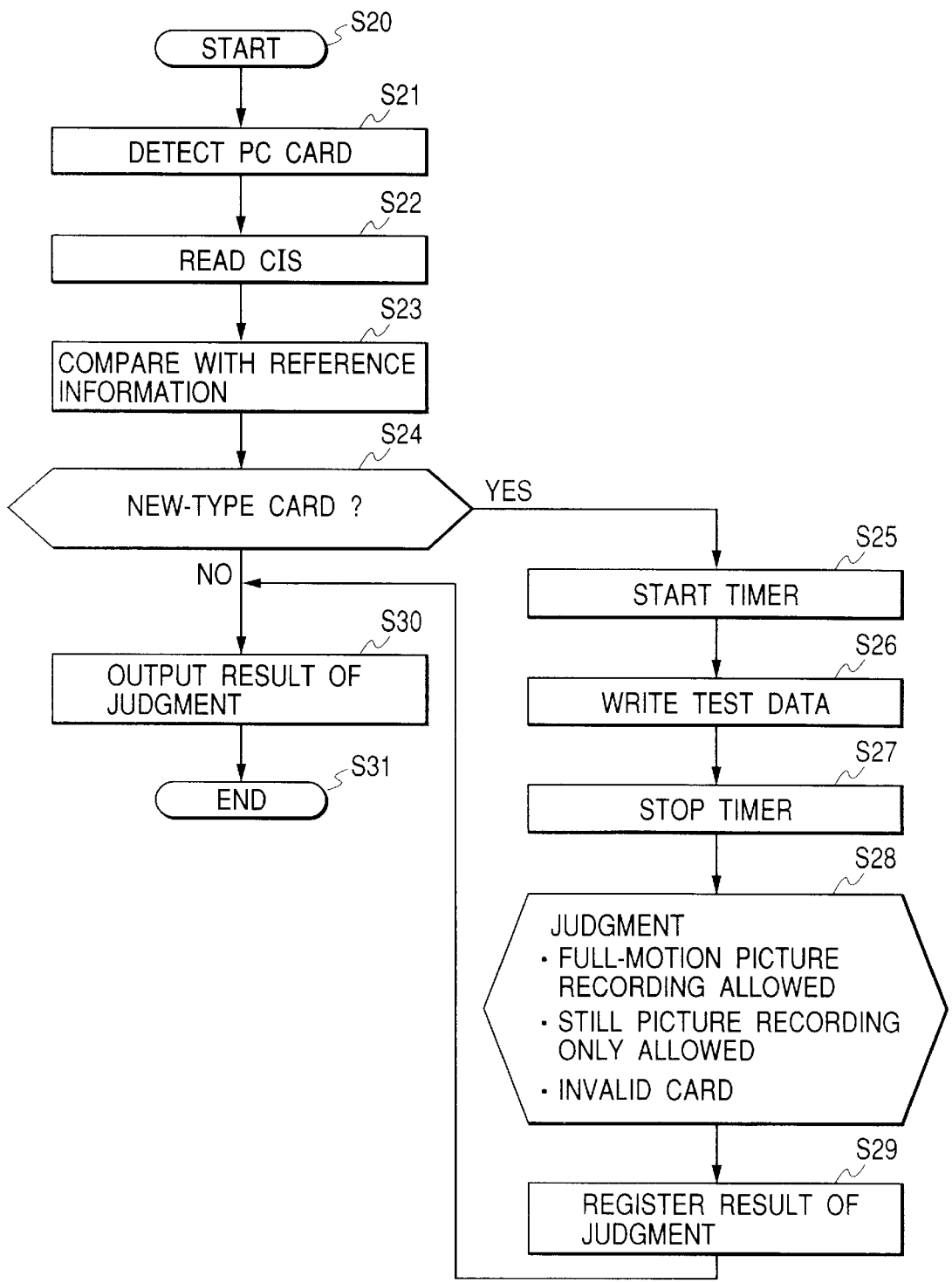

`US 6,590,609 B1`

IMAGE SIGNAL RECORDING SYSTEM

BACKGROUND OF THE INVENTION

1. Field of the Invention

The present invention relates to image signal recording systems, and more particularly to an image signal recording system for storing image signals of full-motion pictures or still pictures onto removable storage media.

2. Description of Related Art

An image signal recording system for storing full-motion picture image signals or still picture image signals is reported in IEEE Transaction on Consumer Electronics, Vol. 42, No. 3, August 1996, p. 776–p. 779, for example, in which image signals acquired through an image sensor or image signals received from an external image signal source such as VCR are converted into digital signals and then, after correction of a picture size and the number of vertical lines, these digital signals are stored as full-motion or still picture data.

In Japanese Non-examined Patent Publication No. 253251/1994, there is also disclosed a digital camera which has a compact circuit including a line memory and a frame memory for compressing full-motion pictures or still pictures and storing them onto a removable memory card.

As a removable memory card, there is a PC card meeting the PC Card Standards. For storing data, a hard disk card, SRAM card, flash memory card, etc. are available.

As a full-motion picture data compression method, the MPEG (Moving Picture coding Experts Group) 1 and MPEG2 are standardized, for example. Even in the MPEG1 which provides relatively slow transfer of data, a write data transfer rate of approx. 1.5 Mbits/s is employed in common applications. For realtime recording, it is required for a storage medium to support a write data transfer rate sufficiently higher than that of image signals.

A write data transfer rate of said hard disk card and SRAM card is approx. 15 Mbits/s, which poses no problem in image data storage, whereas a write data transfer rate of most types of flash memory cards having ATA interface is less than 1 Mbit/s, which is not suitable for storage of full-motion picture data. Even for still picture data, a certain limitation is imposed inconveniently on an interval between shots in a continuous shot operation due to an inadequate write data transfer rate of a storage medium employed.

Conventionally, however, any arrangement applicable to write data transfer rates of various kinds of general-purpose storage media has not been devised yet.

SUMMARY OF THE INVENTION

It is therefore an object of the present invention to obviate the abovementioned disadvantage by providing an image signal recording system which is capable of performing optimum storage setting for full-motion or still picture data to meet a write data transfer rate of each kind of storage medium employed.

In accomplishing this object of the present invention and according one aspect thereof, there is provided an image signal recording system comprising data transfer rate detecting means for detecting a write data transfer rate of each kind of storage medium employed and recording mode selector means for selecting an optimum recording mode for said storage medium based on the detected write data transfer rate thereof.

BRIEF DESCRIPTION OF THE DRAWINGS

These and other features, objects and advantages of the present invention will become more apparent from the following description when taken in conjunction with the accompanying drawings wherein:

FIG. 2 is a flowchart showing part of sequence in a first preferred embodiment of the present invention;

FIG. 3 is a flowchart showing part of sequence in a second preferred embodiment of the present invention;

FIG. 4 is a flowchart showing part of sequence in a third preferred embodiment of the present invention.

DETAILED DESCRIPTION OF THE PREFERRED EMBODIMENTS

The present invention will now be described in further detail by way of example with reference to the accompanying drawings.

Figure 1:
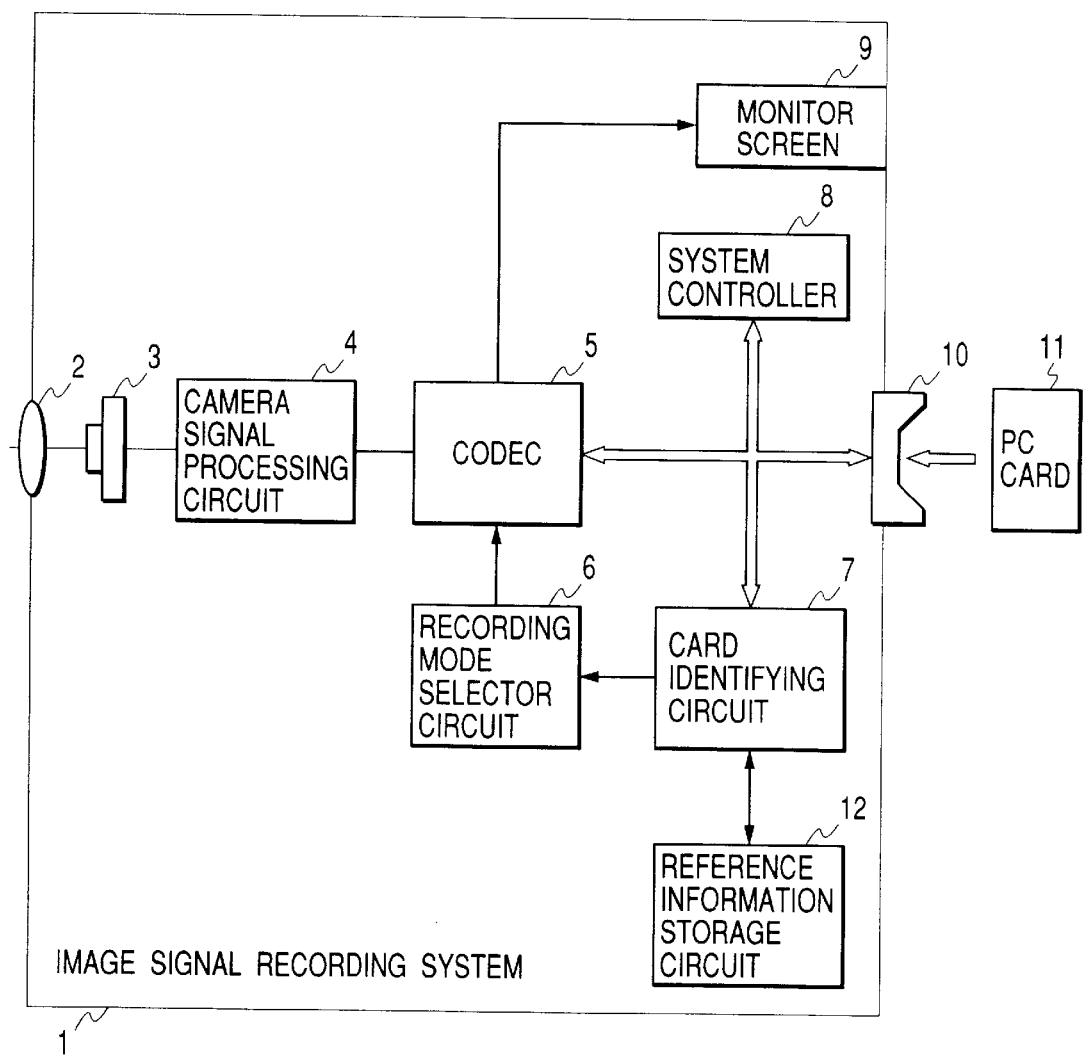
FIG. 1 is a circuit block diagram showing one preferred embodiment of an image signal recording system according to the present invention.

Referring to FIG. 1, there is shown a basic configuration block diagram of an image signal recording system in a preferred embodiment of the present invention, in which numeral 1 indicates an entire arrangement of the image signal recording system, numeral 2 indicates a lens, numeral 3 indicates an image sensor, numeral 4 indicates a camera signal processing circuit, numeral 5 indicates an image signal compression circuit, numeral 6 indicates a recording mode selector circuit, numeral 7 indicates a card identifying circuit, numeral 8 indicates a system controller, numeral 9 indicates a monitor screen, numeral 10 indicates a card socket, numeral 11 indicates a PC card, and numeral 12 indicates a reference information storage circuit.

An image converged through the lens 2 is formed on the image sensor 3, in which it is converted into an electrical image signal. After processed through the camera signal processing circuit 4 including such known circuits as a white balance circuit, etc., the image signal is compressed as still or full-motion picture data by the compression circuit 5. Then, through the socket 10, the compressed still or full-motion picture data is stored onto the PC card 11. An image being recorded is displayed on the monitor screen 9 so that an operator of the image signal recording 1 can monitor the image.

Referring to FIG. 2, there is shown a recording mode setup procedure. The following describes the recording mode setup procedure to be taken when the PC card is used as a storage medium.

The PC card is provided with a connector pin for checking whether the connector of the PC card is inserted into the card socket. By monitoring connection of this connector pin, it is detected that the PC card is mounted on the card socket (S2).

Then, card attribute information held in an attribute memory (CIS: Card Information Structure) is verified (S3). The PC cards include hard disk cards and memory cards for storing data, modem cards, LAN cards, etc. The CIS contains inherent information on functions of each card, and therefore any card improper for storing data can be rejected first by checking the CIS. Still more, the CIS contains information "CISTPL_MANFID, CISTPL_VER_1" indicating a card manufacturer, card designation, etc. Using this information, a manufacturer and model code of each card can be attained.

In the reference information storage circuit 12, write data transfer rates of various kinds of PC cards are pre-stored together with information on manufacturers, model codes, etc. thereof. By comparing these reference information registered in the reference information storage circuit 12 with the contents of CIS, a write data transfer rate of each PC card mounted on the card socket can be identified (S4).

In a situation that a full-motion picture data transfer rate is fixed in the image signal recording system shown in FIG. 1, the following operations are performed: If a write data transfer rate of the PC card is found to be sufficiently higher than that required for full-motion picture data recording, it is decided to allow recording full-motion pictures. If the write data transfer rate of the PC card is found to be slower than that required for full-motion picture data recording, it is decided to allow recording still pictures only. If the PC card is found to be improper for storing data, the PC card is decided to be invalid (S5).

The result of decision is output to the recording mode selector circuit 6 (S6). According to said result of decision, the recording mode selector circuit 6 supplies the image signal compression circuit 5 with a control signal indicating any one of the following conditions; both full-motion picture recording and still picture recording are allowed, still picture recording only is allowed, and image signal compression is inhibited due to invalidity for picture data storage. Besides, the recording mode selector circuit 6 may be arranged to let the operator of the image signal recording system know which recording mode is selectable (not illustrated).

Although the recording mode selector circuit 6 and the card identifying circuit 7 are provided separately for ease of understanding in the preferred embodiment shown in FIG. 1, these circuits may be implemented in the system controller 8 in common practice.

As mentioned above, according to the present preferred embodiment, the operator of the image signal recording system can know whether each PC card is suitable for full-motion picture recording or still picture recording just by mounting the PC card on the recording system without having to remember suitability thereof or refer to any suitability reference information table.

For any data-storage PC card that will be put on the market after the reference information is registered in the image signal recording system, i.e., a PC card whose reference information is not contained in the reference information storage circuit 12, presetting may be made so that recording both full-motion and still pictures is allowed or recording still pictures only is allowed. If a write data transfer rate of said PC card is sufficiently high, full-motion pictures can be recorded normally. If not, full-motion picture recording is interrupted prematurely. Even in the latter case, however, the reference information storage circuit 12 may be arranged so that the contents thereof can be updated on the instant, thereby making it possible to prevent recurrence of such an inconvenient condition.

After the image signal recording system described in the present preferred embodiment is placed on the market, the reference information storage circuit 12 designed on a basis of software can be updated with ease.

Furthermore, while the present preferred embodiment has been described in connection with the PC cards including memory cards and hard disk cards, it is to be understood that the invention is applicable to other kinds of storage media through the PC Card Standard interface.

Referring to FIG. 3, there is shown a flowchart indicating another preferred embodiment different from the abovementioned embodiment shown in FIG. 2. Although the hardware structure is the same as shown in FIG. 1, the image signal recording system in the preferred embodiment shown in FIG. 3 is arranged so that it has a functional feature permitting a variable rate of full-motion picture data transfer.

A card detection step (S11), CIS read step (S12), and reference information comparison step (S13) are the same as those in the preferred embodiment shown in FIG. 2. Description of these steps is therefore omitted here.

After the reference information comparison step (S13), decision is made to identify any one of the following PC card categories; PC card capable of high-quality full-motion picture recording at a registered transfer rate, PC card which is not capable of high-quality full-motion picture recording but supports low-quality full-motion picture recording at a decreased transfer rate, PC card which allows recording still pictures only at a low transfer rate, and PC card not suitable for storing picture data such as a modem card. The result of decision is output to the recording mode selector circuit 6 (S15).

According to said result of decision, the recording mode selector circuit 6 supplies the image signal compression circuit 5 with a control signal indicating any one of the following conditions; high-quality full-motion picture recording, low-quality full-motion picture recording and still picture recording are all allowed, low-quality full-motion picture recording and still picture recording are allowed, still picture recording only is allowed, and image signal compression is inhibited due to invalidity for picture data storage. Besides, the recording mode selector circuit 6 may be arranged to let the operator of the image signal recording system know which recording mode is selectable (no illustrated).

Although the image signal recording system 1 in the present preferred embodiment provides two levels of write data transfer rates for high-quality full-motion picture recording and low-quality full-motion picture recording, it is to be understood that the invention is not limited in its application to selectivity of just two levels of write data transfer rates.

Figure 5:
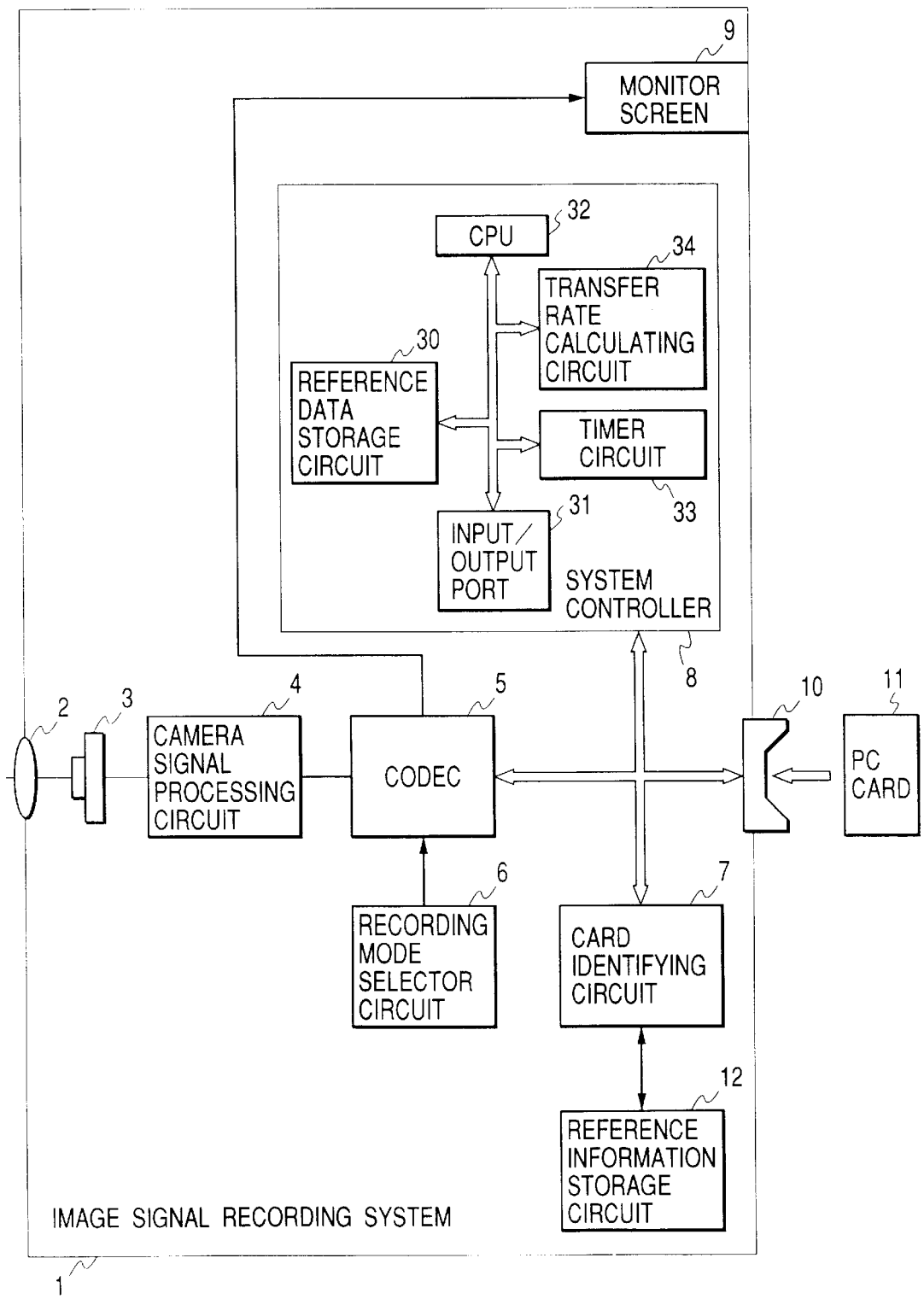
FIG. 5 is a circuit block diagram showing said third embodiment of the present invention.

Referring to FIG. 4, there is shown a flowchart indicating another preferred embodiment different from the foregoing embodiments shown in FIGS. 2 and 3. A unique feature of the preferred embodiment shown in FIG. 4 is that a write data transfer rate of each PC card 11 mounted on the image signal recording system 1 is measured directly. FIG. 5 shows the hardware configuration of the present preferred embodiment. In this figure, the same parts as those in FIG. 1 are indicated by the same numerals. Description of these same parts is omitted here. In FIG. 5, numeral 30 indicates a reference data storage circuit, numeral 31 indicates an input/output port, numeral 32 indicates a CPU, numeral 33 indicates a timer circuit, and numeral 34 indicates a transfer rate calculating circuit.

In the processing flowcharted in FIG. 4, a card detection step (S21), CIS read step (S22), and reference information comparison step (S23) are the same as those in the preferred embodiments shown in FIGS. 2 and 3. Description of these steps is therefore omitted here. At the reference information comparison step (S23), if a PC card mounted on the card socket 10 is found to be any one of cards registered already (S24—NO), it is not necessary to measure a write data transfer rate. In this case, the result of decision is output immediately (S30).

If the PC card mounted on the card socket 10 is found to be an unknown new-type card whose write data transfer rate is not yet registered (S24—YES), the CPU 32 shown in FIG. 5 issues a start-of-measurement instruction to the timer circuit 33 (S25). The CPU 32 also carries out an instruction for writing a predetermined amount of test reference data from the test reference data storage circuit 30 to the PC card through the input/output port 31. Upon completion of writing the predetermined amount of test reference data, the CPU 32 instructs the timer circuit 34 to stop measurement (S27) and deliver a measured period of time to the transfer rate calculating circuit 34. A write data transfer rate inherent to each PC card can thus be determined through dividing the amount of written data by the measured period of time. The calculated value of write data transfer rate includes a time required for execution of instructions handled between the image signal recording system 1 and the PC card, i.e., a command overhead time. Since a similar command overhead time is required when full-motion picture data is written to the PC card in actual applications, the calculated write data transfer rate represents a value that is nearer an actual write data transfer rate than a theoretical write data transfer rate of the PC card.

According to the result of measurement mentioned above, decision is made whether the PC card is suitable for full-motion picture recording or still-picture recording (S28) and the result of decision is output to the recording mode selector circuit 6. In addition, the result of decision is registered in the reference information storage circuit 12 for the purpose of updating (not illustrated) (S29).

Although only one full-motion picture recording mode is provided in the present preferred embodiment, high-quality and low-quality full-motion picture recording modes may be provided as exemplified in the embodiment shown in FIG. 3.

Still more, the image signal compression circuit 5 may be arranged to allow arbitrary setting of a data compression ratio thereof. In this arrangement, it is possible to output information on a write data transfer rate only to the recording mode selector circuit 6 at the decision processing step S28 so that the recording mode selector circuit 6 sets up an optimum full-motion picture data transfer rate for each PC card 11 mounted on the card slot.

Although the reference information storage circuit 12 is provided in the present preferred embodiment, it is also possible to exclude the reference information storage circuit 12 for reduction in production cost of the image signal recording system since a write data transfer rate of each PC card mounted can be measured as described above.

According to the present preferred embodiment, applicability of the invention can be enhanced significantly since a write data transfer rate of any unknown new-type PC card can be measured.

As set forth hereinabove, this invention provides an image signal recording system which is capable of performing optimum storage setting for full-motion or sill picture data to meet a write data transfer rate of each kind of PC card or other storage medium employed. Further, embodiment of this invention requires a considerably low cost since it can be carried out just by incorporating additional software in card detection and CIS read functions provided in an image signal recording system using a PC card.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications as fall within the ambit of the appended claims.

What is claimed is:

1. An image signal recording system which records image signals in digital form, comprising:
    an image signal compressor which compresses said image signals as still or full-motion picture data;
    a recording circuit which records an output from said image signal compressor onto a removable storage medium containing inherent information thereon;
    a data transfer rate detector which detects a write data transfer rate of said storage medium using said inherent information; and
    an image signal compression ratio instructing circuit which adjusts an image signal compression ratio of said image signal compressor according to an output of said data transfer rate detector.

2. An image signal recording system according to claim 1, wherein said data transfer rate detector comprises:
    a circuit which identifies inherent information on said storage medium;
    a reference information storage circuit which pre-stores reference information and write data transfer rates on various kinds of storage media; and
    an output circuit which compares identified inherent information on said storage medium with reference information registered in said reference information storage circuit and which delivers a write data transfer rate of said storage medium.

3. An image signal recording system according to claim 1, wherein said data transfer rate detector comprises:
    an identification circuit which identifies inherent information on a manufacturer and model code of said storage medium;
    a reference information storage circuit which pre-stores reference information on manufacturers, model codes and write data transfer rates of various kinds of storage media; and
    an output circuit which compares identified inherent information on said storage medium with reference information registered in said reference information storage circuit and which delivers a write data transfer rate of said storage medium.

4. An image signal recording system according to claim 3, wherein said image signal compression ratio instructing circuit performs selection between high-quality full-motion picture recording mode and low-quality full-motion picture recording mode according to identified inherent information on said storage medium.

5. An image signal recording system according to claim 1, wherein said data transfer rate detector comprises:
    a write circuit which writes a predetermined amount of reference data onto said storage medium;
    a timer circuit which measures a period of time to be taken to write said predetermined amount of reference data onto said storage medium; and
    a transfer rate calculating circuit which calculates a write data transfer rate from said predetermined amount of reference data and said period of time measured by said timer circuit.

6. An image signal recording system according to claim 5, wherein said data transfer rate detector further comprises:
    a transfer rate storage circuit which stores identified inherent information on a manufacturer and model code and a calculated write data transfer rate of said storage medium.

7. An image signal recording system according to claim 3, wherein a PC card meeting the PC Card Standards is used as said removable storage medium, said identification circuit identifies inherent information on a manufacturer and model code of said PC card according to "CISTPL_MANFID, CISTPL_VER_1" contained therein, said reference information storage circuit pre-stores reference information on "CISTPL_MANFID, CISTPL_VER_1" and write data transfer rates of various kinds of PC cards, and the output circuit compares identified "CISTPL_MANFID, CISTPL_VER_1" of said PC card with reference information registered in said reference information storage circuit and delivers said write data transfer rate of said PC card.

8. An image signal recording system according to claim 3, wherein said removable storage medium provides physical and electrical connections meeting the PC Card Standards.

9. An image signal recording system which records image signals in digital form, comprising:
   an image signal compressor which compresses said image signals as still or full-motion picture data;
   a recording circuit which records an output from said image signal compressor onto a removable storage medium containing inherent information thereon;
   a data transfer rate detector which detects a write data transfer rate of said storage medium using said inherent information; and
   an image signal compression procedure instructing circuit which inhibits said image signal compressor from compressing image signals as full-motion picture data according to an output of said data transfer rate detector.

10. An image signal recording system according to claim 9, wherein said data transfer rate detector comprises:
   a circuit which identifies inherent information on said storage medium;
   a reference information storage circuit which pre-stores reference information and write data transfer rates on various kinds of storage media; and
   an output circuit which compares identified inherent information on said storage medium with reference information registered in said reference information storage circuit and which delivers a write data transfer rate of said storage medium.

11. An image signal recording system according to claim 9, wherein said data transfer rate detector comprises:
   a circuit which identifies inherent information on a manufacturer and model code of said storage medium;
   a reference information storage circuit which pre-stores reference information on manufacturers, model codes and write data transfer rates of various kinds of storage media; and
   an output circuit which compares identified inherent information on said storage medium with reference information registered in said reference information storage circuit and which delivers a write data transfer rate of said storage medium.

12. An image signal recording system according to claim 11, wherein said image signal compression procedure instructing circuit performs selection between high-quality full-motion picture recording mode and low-quality full-motion picture recording mode according to identified inherent information on said storage medium.

13. An image signal recording system according to claim 9, wherein said data transfer rate detector comprises:
   a write circuit which writes a predetermined amount of reference data onto said storage medium;
   a timer circuit which measures a period of time to be taken for writing said predetermined amount of reference data onto said storage medium; and
   a transfer rate calculating circuit which calculates a write data transfer rate from said predetermined amount of reference data and said period of time measured by said timer circuit.

14. An image signal recording method using an image signal compressor which compresses image signals as still or full-motion picture data, a recording circuit which records an output from said image signal compressor onto a removable storage medium containing inherent information thereon, a data transfer rate detector which detects a write data transfer rate of said storage medium using said inherent information, and an image signal compression ratio instructing circuit which adjusts an image signal compression ratio of said image signal compressor, the method comprising the steps of:
   reading inherent information on said storage medium,
   detecting a write data transfer rate of said storage medium by comparing said inherent information on said storage medium with pre-stored reference information on a write data transfer rate of each kind of storage medium, and
   adjusting an image signal compression ratio of said image signal compressor according to said detected write data transfer rate of said storage medium.

15. An image signal recording method using an image signal compressor which compresses image signals as still or full-motion picture data, a recording circuit which records an output from said image signal compressor onto a removable storage medium containing inherent information thereon, a data transfer rate detector which detects a write data transfer rate of said storage medium using said inherent information, including a circuit which identifies inherent information on said storage medium, a reference information storage circuit which pre-stores reference information and write data transfer rates on various kinds of storage media, and an output circuit which compares identified inherent information on said storage medium with reference information registered in said reference information storage circuit, and an image signal compression ratio instructing circuit which adjusts an image signal compression ratio of said image signal compressor, the method comprising the steps of:
   reading inherent information on said storage medium,
   detecting a write data transfer rate of said storage medium by comparing said inherent information on said storage medium with reference information registered in said reference information storage circuit, and
   adjusting an image signal compression ratio of said image signal compressor according to said detected write data transfer rate of said storage medium.

16. An image signal recording method using an image signal compressor which compresses image signals as still or full-motion picture data, a recording circuit which records an output from said image signal compressor onto a removable storage medium containing inherent information thereon, a data transfer rate detector which detects a write data transfer rate of said storage medium using said inherent information, and an image signal compression ratio instructing circuit which adjusts an image signal compression ratio of said image signal compressor, the method comprising the steps of:
   writing a predetermined amount of reference data onto said storage medium, measuring a period of time to be taken for writing said predetermined amount of reference data onto said storage medium, calculating a write data transfer rate from said predetermined amount of reference data and said period of time measured in the measuring step, and determining an image signal compression ratio from said calculated write data transfer rate.

17. An image signal recording method using an image signal compressor which compresses image signals as still or full-motion picture data, a recording circuit which records an output from said image signal compressor onto a removable storage medium containing inherent information thereon, and a data transfer rate detector which detects a write data transfer rate of said storage medium using said inherent information, including a reference information storage circuit which pre-stores reference information and write data transfer rates on various kinds of storage media, the method comprising the steps of:

reading inherent information on said storage medium, and detecting a write data transfer rate of said storage medium by comparing said inherent information on said storage medium with reference information registered in said reference information storage circuit.

18. An image signal recording method using an image signal compressor to compress image signals as still or full-motion picture data, a recording circuit which records an output from said image signal compressor onto a removable storage medium containing inherent information thereon, and a data transfer rate detector which detects a write data transfer rate of said storage medium using said inherent information, the method comprising the steps of:

writing a predetermined amount of reference data onto said storage medium, measuring a period of time to be taken for writing said predetermined amount of reference data onto said storage medium, calculating a write data transfer rate from said predetermined amount of reference data and said period of time measured in the measuring step, and determining an image signal compression ratio from said calculated write data transfer rate.

* * * * *